Dec. 8, 1936.                LE ROY COOK                2,063,366
                    AUTOMATIC FLUID BRAKE CONTROL
                         Filed May 14, 1934
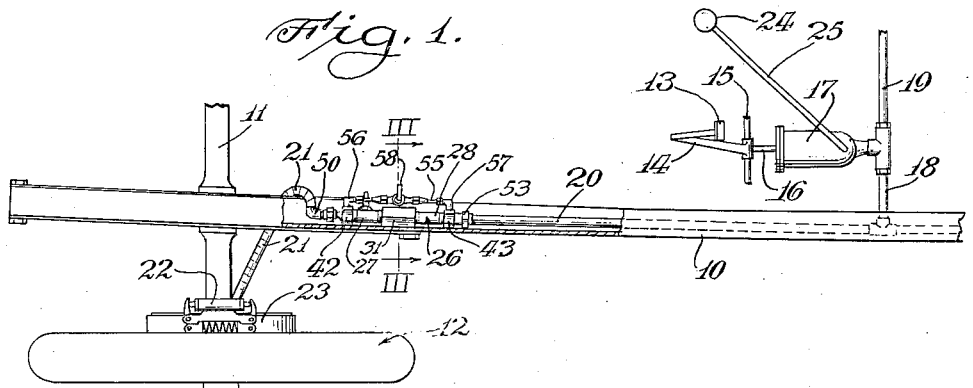
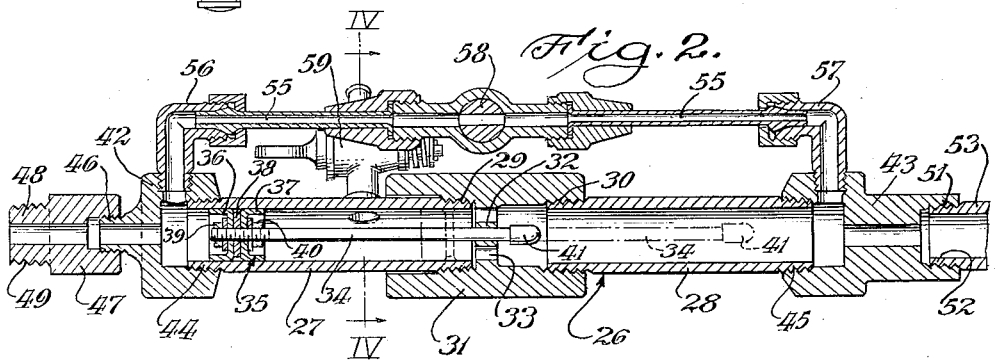
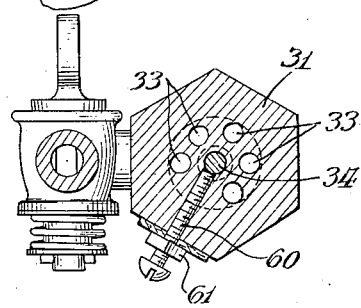
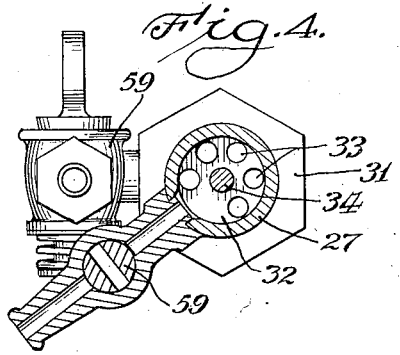
Inventor:
Le Roy Cook,
BY
Harry C. Heintz
Attorney.

Patented Dec. 8, 1936

2,063,366

UNITED STATES PATENT OFFICE 2,063,366

AUTOMATIC FLUID BRAKE CONTROL

Le Roy Cook, Chicago, Ill., assignor of one-half to Hazel M. Dieterle, Chicago, Ill.

Application May 14, 1934, Serial No. 725,487

2 Claims. (Cl. 303—84)

This invention relates to an automatic fluid brake control and more particularly to a safety device for a hydraulic brake system, although certain features thereof may be employed with equal advantage for other purposes.

It contemplates more especially the provision of a simple, inexpensive, and dependable safety device which is automatic in precluding the inopertioned proximate to the contracting or expanding failure in any one brake or series of brakes comprising the system.

The hydraulic brake control system of an automobile chassis requires two or more conduits leading to the several brake operating cylinders positioned proximate to the contracting or expanding brake bands on the wheels of the vehicle. In modern vehicles, there are four brakes which embody these individual brake operating cylinders comprising component elements of the entire control system. The travel of the brake pedal which operates the master cylinder imparts or conveys the desired pressure to the individual brake applying cylinders through the medium of the fluid confined in the system. An appreciable fluid leak between the master and brake operating cylinder or cylinders in the system will render the entire brake system inoperative.

A car equipped with hydraulic brakes on two wheels or on all four wheels includes a corresponding number of flexible tubes extending from the chassis frame to the brake cylinders on the axle, and a failure in the connections or a leak in any one or more of the flexible tubes will preclude the application of the brakes as the volume of the fluid is displaced by the foot pedal in consequence of the pressure required to operate the brakes in that particular system. Failure of the entire fluid brake system occurs, therefore, owing to the inability of the master cylinder to maintain the pressure on the fluid throughout the system in consequence of leakage.

One object of the present invention is to simplify the construction and improve the operation of devices of the character mentioned.

Another object is to provide a safety device for a hydraulic brake system which is simple, inexpensive and dependable in operation.

Still another object is to provide a safety device in a hydraulically controlled braking system which will automatically close off the tube which develops a leak, thereby permitting the hydraulic pressure to operate the remaining brakes of the entire system.

A further object is to provide a safety device for a hydraulic system which embodies a piston valve and is responsive to the fluid confined therein without resort to any springs or other instrumentalities for the actuation or operation thereof.

A still further object is to provide a safety device for a hydraulic braking system which embodies a reciprocally mounted valve having fluid pressure on both sides thereof to respond without requiring any spring actuator or other instrumentality to automatically close the tube wherein a leak develops.

Still a further object is to provide a safety device for a hydraulic braking system which embodies a piston valve having fluid pressure on both sides thereof to serve as a closure for a conduit should a leak develop therein.

Other objects and advantages will appear from the following description of an illustrative embodiment of the present invention.

In the drawing:

Figure 1 is a fragmentary plan view of a vehicle chassis showing a portion of the hydraulic braking system having a safety device embodying features of the present invention.

Figure 2 is a sectional view of the safety device disclosed in Figure 1 as a part of the hydraulic system.

Figure 3 is a sectional view taken substantially along line III—III of Figure 1.

Figure 4 is a sectional view taken substantially along line IV—IV of Figure 2.

The structure selected for illustration is shown in association with a vehicle chassis 10 mounted on axles 11 having wheels 12 for movably sustaining the chassis 10 which is propelled along a surface with minimum resistance to effect the traverse thereof. The vehicle chassis 10 is provided with a brake pedal 13 having a bell crank lever 14 mounted on the shaft 15 so that its lower end may be connected to the piston rod 16. The piston rod 16 actuates a piston (not shown) in the master cylinder 17 constituting a part of a hydraulic braking system.

Fluid supply lines 18 and 19 communicate with the master cylinder 17 and are connected to conduits 20 on each side of the vehicle chassis 10 so as to communicate with flexible tubes 21 connected to the respective brake actuating cylinders 22 operatively connected to the braking instrumentalities 23 constituting a part of the wheel assembly 12. In order to keep the fluid brake system 17—18—19—20—21—22 completely filled with the pressure conveying fluid, a fluid reservoir 24 is sustained on any part of the chassis 10 in a position above the master cylinder 17 which has communication therewith through tube 25 which conveys additional fluid to the master cylinder 17 and the entire braking system should the system be only partially filled at the time the braking pedal 13 is actuated. The reservoir 24 is filled at intervals so as to retain the entire fluid braking system completely filled, thereby insuring proper operation of the brakes responsive to the application of force to the foot pedal 14.

It is apparent that the flexible tubes 21 may deteriorate or for one reason or another establish leaks while the vehicle 10 is in operation. Consequently, the fluid in the braking system 17—18—19—20—21—22 will flow through the flexible tube that springs a leak, thereby precluding the operation of the entire braking system. This may prove disastrous and can result in the occurrence of serious accidents to the end that hydraulic brakes however advantageous, are not altogether dependable. To this end, the safety device 26 is incorporated in the fluid system immediately in front of the flexible tubes 21 which communicate with each braking cylinder 22 associated with the brakes 23 on each wheel 12 of the vehicle chassis 10. The positioning of the safety device 26 and the number thereof embodied in any fluid brake system may be varied to meet the dictates of commercial practice.

The safety device 26 comprises, in this instance, a valve body which is preferably although not essentially composed of cylindrical tubes 27 and 28 having threaded extremities 29 and 30, respectively, to effect engagement with a coupler 31 having an internal partition 32 intermediate the extremity thereof. The coupler partition 32 is provided with a plurality of circumferentially spaced apertures 33 which establish fluid communication between the interior of the tubes 27 and 28 comprising a valve body 26. An axial aperture is provided in the partition 32 so as to receive a rod 34 reciprocally mounted therethrough for the purpose of mounting a valve 35 at one extremity thereof. The valve 35 preferably comprises a pair of flexible cup-shaped washers 36 and 37 which are sized to embrace the interior of the tube 27 so as to preclude direct transmission of fluid from one side thereof to the other. The cup-shaped washers 36 and 37 are separated by a disc 38 and threaded nuts 39 and 40 engage the corresponding threaded extremity of the rod 34 so as to hold the valve assembly 35 in position and to preclude the direct passage of fluid therearound.

In order to limit the displacement of the valve 35 to its extreme position within the tube 27, an interiorly threaded tubular member 41 is secured to the extremity of the rod 34 which projects within the tube 28, thereby abutting the partition 32 in the coupler 31 when the valve 35 reaches its extreme position of displacement. As shown, the tubes 27 and 28 are provided with end couplers 42 and 43 which are in threaded engagement with the extremities 44 and 45 thereof and enable the connection of the entire valve body assembly 26 in the fluid line 20—21 of the braking system which communicates with each brake actuating cylinder 22. For that purpose, the coupler 42 terminates in an axial tubular extension 46 which is threaded to receive another coupler 47 thereon.

The coupler 47 has a reduced axial extension 48 which is also threaded as at 49 to enable engagement with a correspondingly threaded elbow 50 comprising a part of a flexible tube 21 that leads to the brake actuating cylinder 22. The coupler 43 has, in this instance, its tubular extremity provided with an internal thread 51 which engages the correspondingly threaded extremity 52 comprising a part of a coupler member 53 which establishes connection with the fluid pipe 20, thereby incorporating the safety device 26 into the branched lines 20 of a fluid brake system that communicates with each brake actuating cylinder 22 therein.

In order to render the system operable in the event that the piston valve 35 should become inoperative for one reason or another (which is not expected nor has developed any trouble to date in the use thereof) and to enable completely filling the entire system with the fluid pressure medium on both sides of the safety valve 35, a by-pass tube 55 is, in this instance, connected to elbows 56 and 57 which are in threaded engagement with the end couplers 42 and 43 of the tubes 27 and 28 comprising parts of the safety device housing 26. A valve 58 is incorporated in the by-pass tube 55 intermediate the extremities thereof so as to control the passage of the fluid therethrough, it being manually operable for selective use as conditions may require. Consequently, the fluid can flow from the master cylinder 17 to the individual brake actuating cylinders 22 through the by-pass tube 55 for filling the entire system with the fluid pressure medium or in the event the valve 35 should become inoperative.

This is accomplished by merely opening the manual valve 58 as conditions may require for one purpose or another. In filling the system with the fluid pressure medium, the manual by-pass valve 58 is opened so that the fluid will pass around both ends of the safety piston valve 35 and this continues until the air bubbles cease to escape through a manual bleeder valve 59 attached to the tube 27 for communication with the interior thereof. The valve 59 is opened until the fluid pressure medium escapes therethrough and thereupon is closed, it being provided to enable the complete escape of air in the system which is to be avoided. Then, too, the safety valve 35 is displaced toward the partition member 32 during the filling of the fluid system, and is there retained by means of a set screw 60 which is threadedly engaged with the coupler 31 in the region of the partition member 32 so that the extremity thereof engages the valve rod 34.

A lock nut 61 is provided on the set screw 60 so as to retain it in adjusted position both during the filling of the fluid system and otherwise when removed from engagement with the rod 34. It will be observed that no springs are essential or necessary for the proper operation of the valve 35 and should there be a leak or break in the flexible tube 21 or in that part of the system behind the safety device 26, then the reduction of pressure on the valve washer 36 will cause the entire valve 35 to be displaced in the direction of the valve housing extremity 42 so that the rod end 41 will abut against the partition member 32, and there hold the fluid that exerts a pressure on the valve washer 37 to preclude the leakage and to maintain the pressure in every other part of the system.

As a result, the other brakes of the system may be utilized and may be effectively operated responsive to force applied to the brake pedal 13. The valve 35 is actuated responsive to the variation in pressure on both sides thereof, and does not rely upon any auxiliary instrumentalities that may in itself prove troublesome. Various changes may be made in the embodiment of the invention herein specifically described without departing from or sacrificing any of the advantages of the invention as defined in the appended claims.

I claim:

1. In a hydraulic controlled braking system having a plurality of conduits for effecting pressure application and release to a corresponding number of individual brakes including a valve chamber in each of said conduits, a piston valve in said chamber, oppositely disposed cupped-discs on said piston valve with fluid pressure on each side thereof for actuating the brakes through the medium of said piston valve, said valve chamber having an apertured partition wall intermediate the length thereof, a rod extending axially from said piston valve for reciprocal projection through said partition wall for guidance along said valve chamber, and means on the end of said rod to abut against said partition wall in precluding the removal of said rod therefrom, thereby limiting the travel of said piston valve between predetermined limits.

2. In a hydraulic controlled braking system having a plurality of conduits for effecting pressure application and release to a corresponding number of individual brakes including a valve chamber in each of said conduits, a piston valve in said chamber, oppositely disposed cupped-discs on said piston valve with fluid pressure on each side thereof for actuating the brakes through the medium of said piston valve, said valve chamber having an apertured partition wall intermediate the length thereof, a rod extending axially from said piston valve for reciprocal projection through said partition wall for guidance along said valve chamber, means on the end of said rod to abut against said partition wall in precluding the removal of said rod therefrom and limiting the travel of said piston valve between predetermined limits, and a screw fastener extending transversely through said valve chamber to engage said piston valve rod to retain said valve against movement during the fluid charging of the valve chamber.

LE ROY COOK.